United States Patent [19]

Stayner

[11] 4,005,304
[45] Jan. 25, 1977

[54] ELECTRICAL DISCHARGE MACHINING PROCESS WITH FLUID CONTAINING A CATIONIC ORGANIC SURFACTANT

[75] Inventor: Robert A. Stayner, Lafayette, Calif.

[73] Assignee: Chevron Research Company, San Francisco, Calif.

[22] Filed: June 30, 1975

[21] Appl. No.: 591,345

[52] U.S. Cl. .......................... 219/69 D; 219/69 M
[51] Int. Cl.$^2$ .......................................... B23P 1/08
[58] Field of Search ............ 219/69 D, 69 M, 69 E

[56] References Cited

UNITED STATES PATENTS

| | | | |
|---|---|---|---|
| 3,334,210 | 8/1967 | Williams et al. | 219/69 D |
| 3,648,013 | 3/1972 | Stayner | 219/69 D |

OTHER PUBLICATIONS

Metals Handbook, Amer. Soc. for Metals, vol. 3, 8th Ed., 1967, pp. 227–233.
Kirk–Othmer, Encyclopedia of Chemical Technology, 2nd Ed., vol. 19, Wiley & Sons, 1969, pp. 507–512, 554–564.

Primary Examiner—Bruce A. Reynolds
Attorney, Agent, or Firm—G. F. Magdeburger; C. J. Tonkin

[57] ABSTRACT

An electrical discharge machining process using as a dielectric fluid a composition comprising a base oil and a minor amount of an oil-soluble cationic organic surfactant.

10 Claims, No Drawings

ELECTRICAL DISCHARGE MACHINING PROCESS WITH FLUID CONTAINING A CATIONIC ORGANIC SURFACTANT

BACKGROUND OF THE INVENTION

1. Field of the Invention

This invention concerns electrical discharge machining processes and improved dielectric fluids for use therein.

Electrical discharge machining (EDM) is a method for drilling, cutting or shaping electrically conductive stock by means of the controlled removal of material from the surface through melting or vaporization by high-frequency electrical sparks. The spark discharge is produced by controlled pulsing of direct current between the work piece and the tool or electrode. The end of the electrode and the work piece are separated by a narrow spark gap and are flooded by a dielectric fluid. The dielectric fluid in a gap is partially ionized under the pulsed application of a relatively high voltage, thus enabling a spark discharge to pass between the tool and the work piece. Each spark produces enough heat to melt or vaporize a small quantity of the work piece, leaving a tiny pit or crater in the surface of the work.

EDM is often used when the work material is of high hardness, high tensile strength or poor machinability and the product to be formed is of complex or irregular shape or fragile structure.

The dielectric fluid serves as a spark conductor and coolant, and as a flushing medium for removal of the small particles of material separated from the work piece. In practice, the dielectric fluid is recycled, being collected from the apparatus, filtered and then returned to the apparatus. Dielectric fluids have generally been selected for their high dielectric strength, i.e., low conductivity. Satisfactory fluids should have controlled dielectric properties so as to provide a sizable charge flowing from the electrode to the work piece, should be of a light color so that the work piece can be observed through the oil, should be able to carry detritus to the filter for filtration, and should be oxidatively and thermally stable for long periods of time.

Electrical discharge machining processes and EDM fluids are described in the "Metals Handbook", Vol. 3 (8th Ed., American Society for Metals, Metals Park, Ohio, 1967). EDM is also the subject of an article by Bonales in "Products Engineering", p. 53 (Sept. 27, 1965). EDM is further described in Chapter 31 of the text entitled "Manufacturing Processes and Materials for Engineers" (2d Ed., Prentiss-Hall Inc., 1969). All these are incorporated herein by reference. The voltages used are relatively high, although they are often below 100 V, while being sufficient to generate the pulsed sparks, as described more fully in the foregoing.

EDM and fluids therefor are also disclosed in U.S. Pat. Nos. 3,639,275, 3,648,013 and 3,679,857.

It is found that in some instances finely divided material accumulates in the dielectric fluid, thereby causing darkening of the dielectric fluid, which darkening is disadvantageous in EDM operations. The dispersed, finely divided particles accumulating in the fluid appear to originate from two sources, namely, solidified metal droplets melted off the work piece and electrode wear fragments created by the electric arc. The accumulation of dispersed particles appears to be greater with the newer EDM electrodes, particularly silver tungsten and copper-tungsten electrodes. The accumulation of dispersed particles is also aggravated in the smaller EDM machines, whose filtration systems are incapable of removing particles smaller than about 5 microns in size; since particles smaller than 1 micron are often formed in EDM machining. In the absence of adequate filtration, these dispersed particles circulate with the fluid and darken it as their concentration builds up.

SUMMARY OF THE INVENTION

The invention is directed to electrical discharge machining processes which generate in the dielectric fluid a dispersion of negatively charged, finely divided particles and to the improvement of using as a dielectric fluid a composition comprising a major portion of a base oil of defined properties together with a oil-soluble cationic organic surfactant. The accumulation of finely divided particles dispersed in the dielectric fluid is reduced, whereby the color-darkening of the fluid is minimized, so that the EDM process can be carried out more efficiently. Other advantages of the improved process which are attributed to the presence of the oil-soluble cationic surfactant are as follows:

1. Improved detergency in the spark zone to prevent electrically conductive deposits from collecting there;
2. Faster machining, smoother surface finish, and longer electrode life due to the increased electrical conductivity of the dielectric fluid.

DETAILED DESCRIPTION OF THE INVENTION

This invention concerns an improvement in electrical discharge machining processes and the dielectric fluid used therein, as defined below. By this improvement the dielectric fluid is maintained in a clear, bright liquid condition so that the work can be readily observed and the EDM processing carried out more efficiently. The base oil for use in the dielectric fluid is a hydrocarbon, oxygenated hydrocarbon, silicone oil, or mixtures thereof. The inert base oil which is preferably the predominant portion of the fluid has an initial boiling point of 370° F and preferably above 390° F (199° C). The distillation end point is not greater than 650°–750° F (343°–399° C). The base oil is preferably a narrow cut, i.e., having a boiling range less than 200° F (93° C); a typically preferred base oil is a hydrofined mineral oil having an initial boiling point of about 395° F (201° C) and a 95% boiling point of 550°–570° F (288°–299° C). The flash point of the base oil should be at least 140° F (60° C), preferably at least 155° F (68° C), and more preferably above 200° F (93° C).

The fluid will also have an ASTM D-2161 viscosity in the range of 30–40 SUS, preferably 32–35 SUS, at 100° F. Fluids of lower viscosity have unacceptably low flash points, and thus pose safety problems. Higher-viscosity fluids are too viscous to flow properly through the narrow spark gap and remove the detritus. Preferably the fluid has an aromatic content of below 10%, and preferably below 5%.

The EDM fluid will have an electrical conductivity between 50 to 5000 picomhos per meter. This unit is described in "Electrostatics in the Petroleum Industry", by Klinkenberg and van der Minne (Elsevier Publishing Co., 1958), at pages 9–10. The conductivity should be below that of deionized water, and more preferably between 50–500 picomhos per meter. Conductivity is measured in accordance with the ASTM D3114-72 method.

The base oil should be initially clear and transparent so that the work can be readily observed through the fluid.

The oil-soluble, cationic organic surfactant will be present in an effective amount of at least 500 ppm, sufficient to substantially reduce the negative charge on the dispersed particles in the dielectric fluid. The surfactant can be present in amounts up to 50,000 ppm or 5%, but more preferably in present in amounts less than 5000 ppm or 0.5%.

As stated, the surfactant is cationic, surface-active. Kirk-Othmer "Encyclopedia of Chemical Technology," 2d Ed., Vol. 19 (John Wiley & Sons, Inc., 1969), further describes characteristics of surfactants, generally at pp. 507–512, and of cationic surfactants and examples thereof at pp. 554–564, which descriptions are incorporated herein by reference. The active moieties in cationic surfactants are generally amino or quaternary nitrogens, and hence such amino and quaternary nitrogen compounds are generally preferred. While the quaternary ammonium chlorides and sulfates can be used for their coagulating effect, it is preferred to use cationic surfactants which are free of chlorine and sulfur, particularly where the work piece will be subjected to bending or torque stresses. Usually the quaternary ammonium hydroxides are avoided because of the odor due to Hofmann reaction degradation products. Thus, of the ammonium compounds the quaternary ammonium acetates and phosphates are preferred, as well as the carbonates. The quaternary ammonium compounds are illustrated by the particular surfactants set forth in Kirk-Othmer, referred to above, particularly at pp. 562–564, as well as those quaternary ammonium salts of analogous structure wherein the chloride is substituted with acetate, carbonate or, less preferably, sulfate group.

In most instances, the cationic organic amines and amine salts are preferred. These may be monoamines, but are preferably polyamines. These include the relatively simple amines such as N-alkyl-trimethylenediamine wherein the alkyl group may be derived from cocoa, tallow, soya or other $C_{12}$ + fatty acid materials, or the like, including, for example 9-octadecenyl groups. The term "tallow acids" refers to higher fatty acids present in tallow (beef, mutton, etc.) in the form of glyceride. Not less than about 25% of the acids in tallow are unsaturated $C_{14}$–$C_{18}$ fatty acids (namely, oleic). More generally the unsaturated acid content is from 30–50% by weight. An oil-soluble acyclic alkylenediamine material derived from such tallow is available under the registered trademark "DUOMEEN T". Other desirable diamines comprise those in which the alkyl group is an acyclic hydrocarbon group derived from fatty acids obtained from coconut oil or oleic acid (cis-9-octadecanoic acid). These latter compounds are available under the trademarks "DUOMEEN C" and "DUOMEEN O", respectively, and comprise mixed acyclic hydrocarbon-substituted propylenediamines. For example, the alkyl groups of "DUOMEEN C" are predominantly 12-carbon-atom groups and those of "DUOMEEN O" are largely composed of straight-chain 18-carbon-atom olefinic groups.

Other, more complex amines are the oxygen-containing amines, including amine oxides, polyoxyethylenealkylamines, 1-(2-hydroxyethyl)-2-alkyl-2-imidazolines and N,N,N',N'-tetrakis-substituted ethylenediamine derivatives. Some polyalkoxylated compounds suitable for use in this invention are commercially available under various trade names. Thus, suitable compounds include certain poly(oxyethylene)amines such as ETHODUOMEENS (Armour) and poly-(oxyethylene)imidazolines such as MONAZOLINES (Mona Industries). Particularly preferred are the polyoxyalkylene fatty alkylalkane polyamines wherein said alkane portion has 2 to 3 carbon atoms, such as, for example, as in polyoxyalkylene fatty alkyl-1,3-propanediamines wherein the fatty alkyl group is derived from tallow acids. In general, the polyoxyalkyleneamine surfactants are poly-dispersed mixtures of compounds that differ in the polymer chain length. However, their properties approximate those of the molecule represented by their average composition.

Usually the base oil will consist of a mixture of compounds selected such that the mixture has the requisite properties. These compounds may be all of one type, e.g., all hydrocarbons, or the mixtures may contain, for example, oxygenated hydrocarbons and silicones in varying amounts. The particular compounds must, of course, all be miscible with each other or capable of being made miscible by mutual solvents. They must also be essentially inert in the EDM environment, i.e., substantially unaffected during a normal service life span by the presence of oxygen or air, heat, metal and high-intensity sparks. The hydrocarbons, oxygenated hydrocarbons and mixtures thereof are preferred because the vapors of the silicone fluids sometimes pose a health hazard to operators, unless operational precautions are taken.

"Hydrocarbon oils" as used herein refer to those hydrocarbon compounds which have the requisite initial physical properties. Usually such hydrocarbons will be aliphatic or alicyclic materials, substantially saturated, i.e., having little or usually no aromatic or aliphatic unsaturation. Typical examples are paraffinic and naphthenic oils such as kerosene, transformer oils, and the like.

The "oxygenated hydrocarbons" suitable for use in the process of this invention must be polar, oil-soluble, and will contain only carbon, hydrogen and oxygen; they are usually esters, ethers, lactones or alcohols. Preferred are the esters, particularly the alkyl esters of monocyclic aromatic carboxylic acids. The alkyl groups will usually each have 1 to 20 carbon atoms, preferably 5 to 15 carbon atoms. Preferred monocyclic aromatic carboxylic acids are the dicarboxylic acids having 0 to 2 noncarboxylic substituents of 1 to 4 carbon atoms each on the benzene ring. Typical examples of suitable oxygenated hydrocarbon oils are dioctylphthalate, didecylphthalate, octyldodecylphthalate and the like.

The base oil should be substantially transparent to allow inspection of the work piece during the EDM process. The base oil itself may have a light color and the additives described which may be present may impart some color to this oil. This color should not be so dark, however, that the transparency is significantly impaired.

While other materials such as antioxidants and odor-masking agents or the like can be added to the fluids, it is preferred that the dielectric fluid contain only the cationic organic surfactant in addition to the base oil.

EXAMPLES

The following examples will serve to illustrate the present invention. All parts specified are by weight.

EXAMPLE 1

An EDM fluid designated as Fluid A was prepared from a hydrofined base containing 0.1% of dibutyl paracresol oxidation inhibitor and the cationic organic surfactant, ethoxylated tallow propanediamine (ETHODUOMEEN T-13) in a ratio of 99.95% of the inhibited hydrofined base and 0.05% of the diamine. The hydrofined base oil had the following properties:

| | |
|---|---|
| Gravity, °API | 35.9 |
| Flash Point, ° F, COC | 225 |
| Viscosity at 100° F, SUS | 35.52 |
| Pour Point, ° F | <−80 |
| Color, Saybolt | +26 |
| ASTM D86 Distillation: | |
| IBP | 395 |
| 95% Rec. | 563 |

The resultant EDM Fluid A had an API gravity of 35.9°, a flash point, COC, of 225° F, a viscosity at 100° F of 35.5 SUS, a conductivity of 130 picomhos per meter, and an ASTM color of less than 0.5. This fluid was compared with a commercial EDM fluid designated as Fluid B, which consisted of a base oil (a mixture of 93.95% kerosene, 6% dioctylphthalate and 0.05% of a conductivity additive consisting of equal parts of a chromium salt of a dialkyl salicylic acid derived from phenol alkylated with a mixture of $C_{14}$–$C_{18}$ alkyl groups and calcium didecylsulfosuccinate. Fluid B had a composition of 93.95% kerosene, 6% dioctylphthalate and 0.05% of the conductivity additive. The properties of Fluid B were as follows: gravity, 47.5° API; flash point, 152° F, COC; viscosity of 32 SUS at 100° F; conductivity of 350 picomhos per meter; and an ASTM color of less than 0.5. These fluids were compared in commercial-size EDM machines. One comparison was made on a job involving machining of two slots on opposite sides of stainless-steel handles for dental drilling tools. The electrode material selected for this work was copper graphite, and machining conditions were set for fine finishing. Approximately 2500 parts were made using the comparison Fluid B, then the fluid in the machine was changed to Fluid A and another 2500 parts were made using the same electrodes and same machining conditions. The production rate increased with Fluid A by 21%. In addition, electrode wear decreased by 22%. These substantial improvements are attributed to the presence of the full concentration of surfactant in Fluid A. By comparison, analysis of Fluid B drained from the machine revealed that the conductivity additive originally present was depleted, probably due to repeated filtrations during more than a year's service in the machine. Hence, the comparison is between Fluid A and a fluid which is essentially uncompounded. In this comparison, Fluid A, illustrating the composition of the present invention, shows the improvements of increased production and reduced electrode wear as obtained with a newly compounded dielectric fluid, but also shows the ability to maintain the fluid in a non-darkened condition. Also, it was observed that with Fluid A there was a reduced "smoking" when working above 50 amps in the EDM processing.

In another series of tests, a used dielectric fluid was taken from a commercial EDM machine, and it was found that the fluid was quite black in appearance and the black color did not settle out on standing. Filtration showed that the black color was caused by minute carbon particles which pass through 1.0-micron filter paper but are completely removed by 0.5-micron filter paper. Various additives were added to the foregoing fluid, and the results on standing were noted as shown in the following Table I.

In these tests, each of the additives was added to 10-ml aliquots of the black fluid in 10-ml mixing cylinders. Fluids 1–5, after 20 hours, were filtered through 5-micron paper and their condition observed. Fluids treated with various trademarked surfactants were not filtered and their condition observed at the times indicated.

Table I

| Additive | Conc. | Result |
|---|---|---|
| 1. DuPont metal suppressant | 1.4% | Fluid partly clarified; moderate filter deposit |
| 2. Ethylenediamine | 1.4% | " |
| 3. Triethanolamine | 1.4% | Black fluid, light-moderate filter deposit |
| 4. 2-ethylhexylamine | 1.4% | Black fluid, trace filter deposit |
| 5. Adogen 461 | 1.4% | Fluid partly cleared, moderate filter deposit |
| 6. DuPont metal sup. | 500 ppm | 50% settled in 72 hours |
| 7. Tenamine 60 | 500 ppm | Black after 72 hours |
| 8. Adogen 401 | 500 ppm | Settled clear in 3 hours |
| 9. Adogen 462 | 500 ppm | Settled clear in 3 hours |
| 10. Arquad L-ZPS | 500 ppm | Black after 72 hours |
| 11. Sarkosyl O | 500 ppm | Black after 72 hours |
| 12. Solar IA-350 | 500 ppm | Black after 72 hours |
| 13. Pentecat L | 500 ppm | Settled clear in 72 hours |
| 14. Adogen 462 | 250 ppm | Settled clear in about 5 hours |
| 15. Adogen 462 | 125 ppm | Half clear in 2 weeks |
| 16. Adogen 462 | 62.5 ppm | Black in 2 weeks |
| 17. Adogen 462 | 30 ppm | Black in 2 weeks |

In the above tests, Adogen 462, a product of Ashland Chemicals, is a dimethyl dicoco quaternary ammonium chloride which is supplied as a 75% active soft paste in aqueous isopropanol with the following specifications:

| | |
|---|---|
| Quaternary, % | 75 min. |
| Ash, % | 1.0 max. |
| Free amine, % | 1.5 max. |
| Amine hydrochloride, % | 0.5 max. |
| Color, Gardner | 4 max. |
| Water, % | 7 max. |
| Average molecular weight | 439 |

Typical chain length for the "coco" alkyl groups in Adogen 462 are as follows:

| | | |
|---|---|---|
| $C_8$ Caprylyl | | 5% |
| $C_{10}$ Capryl | | 7% |
| $C_{12}$ Lauryl | | 56% |
| $C_{14}$ Myristyl | | 18% |
| $C_{16}$ Palmityl | | 7% |
| $C_{18}$ Oleyl | | 2% |
| $C_{18}$ Stearyl | | 5% |

These and other tests carried out with quiescent samples of EDM fluids and with circulating fluids in EDM machines show that it is more difficult to coagulate the finely divided dispersed particles in a circulating fluid than it is to keep them from dispersing in the first place. Further, the effectiveness of the cationic surfactant is substantially reduced when used in combination with the conductivity additive consisting of a chromium salt of a dialkyl salicylic acid (derived from phenol alkylated with a mixture of $C_{14}$–$C_{18}$ alkyl groups) and calcium didecylsulfosuccinate; hence it is preferred that the cationic surfactant be incorporated into the dielectric fluid prior to accumulation of the negatively charged, finely divided detritus particles and without the presence of other additives to the base fluid.

In another series of laboratory tests, the dielectric fluid was a used fluid taken from an operating EDM machine wherein the fluid had become black with dispersed particles. Electron-microscope examination of deposits from filtering the samples of the fluid indicated that it contained finely divided amorphous carbon with interspersed crystalline particles of a metal or metals. X-ray diffraction analysis showed that the particulate matter causing the black color consisted predominantly of copper oxides plus tungsten carbides, which appear to have been generated from the copper-tungsten electrodes used with the fluid. The following additives were tested in the fluid in the following manner: 1 drop (approximately 0.28% in the final fluid) of the following additives was added to 1-oz vials filled with the fluid and the vial shaken to dissolve the additives; the vials were then allowed to stand. The results were as follows:

Table II

| Additive | Observations |
|---|---|
| None | No apparent settling for more than 2 weeks |
| Adogen 462 | After 5 hrs agglomeration started, clear overnight |
| Cobratec 99 (a metal deactivator) | After 5 hrs fluid was dark, clear overnight |
| Triisooctylphosphite | No settling overnight |
| Conductivity additive of chromium salt & sulfosuccinate | No settling overnight |
| Tetrabutyl phosphonic acid | No settling overnight, clear after a week |
| Armac C | After 5 hrs agglomeration started, clear overnight |
| Ethoduomeen T-13 | After 5 hrs agglomeration started, clear overnight |
| Tenamine 4 | No settling overnight |
| Tenamine 2 | No settling overnight |
| Antimist agent 1150 | No settling overnight |
| Amine O | No settling overnight |
| Ethoduomeen S-13 | After 5 hours agglomeration started, clear overnight |

Other than those specifically described above, the commercial materials referred to are said to have the compositions indicated in the parentheses after the trade name in the following list: Adogen 461 (alkyl quaternary ammonium chloride), Tenamines 2, 4 and 60 (salicylidene diamine), Pentecat (quaternary ammonium salt), Solar IA-350 (quaternary ammonium salt), Amine O (imidazoline with an oleyl group), Ethoduomeen S-13 (ethoxylated alkyl amine where the alkyl group is derived from soya bean oil), and Armac C (cocoamine acetate).

The above examples and data are intended to be illustrative only and are not to be considered limiting. It will be apparent to those skilled in the art that there are numerous embodiments within the scope and spirit of this invention.

What is claimed is:

1. In a process for electrical discharge machining which comprises passing a spark generated by pulsed application of an electrode at a relatively high voltage to a work piece through a spark gap flooded by a dielectric fluid wherein the process generates in said fluid a dispersion of negatively charged particles from metal droplets melted off the work piece and/or electrode wear fragments, the improvement which comprises at least partially coagulating said dispersed particles with an oil-soluble cationic organic surfactant addition to a dielectric fluid composition consisting essentially of a predominant portion of an inert base fluid selected from the group consisting of hydrocarbon, oxygenated hydrocarbon, silicone oils and mixtures thereof.

2. The process of claim 1 wherein said surfactant is substantially free of chlorine and sulfur.

3. The process of claim 1 wherein said surfactant is a nitrogen compound selected from the group consisting of quaternary ammonium compounds, amines, amine salts and mixtures thereof.

4. In a process for electrical discharge machining which comprises passing a spark generated by pulsed application of an electrode at a relatively high voltage to a work piece through a spark gap flooded by a dielectric fluid wherein there accumultes as a dispersion in said fluid finely divided, negatively charged particles, the improvement which comprises employing as said dielectric fluid a composition consisting essentially of a predominant portion of an inert base fluid selected from the group consisting of hydrocarbon, oxygenated hydrocarbon, silicone oils and mixtures thereof, said inert base fluid having an initial boiling point of at least 370° F, a flash point of at least 140° F, a kinematic viscosity of 30 to 40 SUS at 100° F and an electrical conductivity below that of dionized water, together with an effective amount of at least 500 ppm sufficient to reduce substantially the negative charge on said dispersed particles of an oil-soluble cationic organic surfactant.

5. The process of claim 4 wherein said fluid has an aromatic content of less than 10%.

6. The process of claim 4 wherein said fluid has a flash point above 200° F.

7. The process of claim 4 wherein said conductivity is between 50 and 500 picomhos per meter.

8. The process of claim 4 wherein said surfactant is selected from the group consisting of amines, amine salts and mixtures thereof.

9. The process of claim 8 wherein said amines are polyoxylalkylene fatty alkyl alkane polyamines wherein said alkane portion has 2 to 3 carbon atoms.

10. The process of claim 9 wherein said amines are polyoxyethylene fatty alkyl-1,3-propanediamines.

* * * * *